(12) United States Patent
Petladwala et al.

(10) Patent No.: US 11,755,448 B2
(45) Date of Patent: Sep. 12, 2023

(54) EVENT MONITORING APPARATUS, METHOD AND PROGRAM RECORDING MEDIUM

(71) Applicant: NEC Corporation, Tokyo (JP)

(72) Inventors: Murtuza Petladwala, Tokyo (JP); Shingo Takahashi, Tokyo (JP); Shigeru Koumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 17/263,728

(22) Filed: Jan. 27, 2021

(65) Prior Publication Data

US 2021/0374031 A1 Dec. 2, 2021

(51) Int. Cl.
*G06F 11/34* (2006.01)
*G06F 11/30* (2006.01)
*G06F 18/214* (2023.01)

(52) U.S. Cl.
CPC ...... *G06F 11/3419* (2013.01); *G06F 11/3006* (2013.01); *G06F 11/3447* (2013.01); *G06F 11/3452* (2013.01); *G06F 18/214* (2023.01); *G06F 2201/86* (2013.01)

(58) Field of Classification Search
CPC . G06N 20/00; G06F 11/3006; G06F 11/3419; G06F 11/3447; G06F 11/3452; G06F 18/214
USPC ....................................................... 702/181
See application file for complete search history.

(56) References Cited

U.S. PATENT DOCUMENTS

| 7,933,740 | B2 | 4/2011 | Castelli et al. |
| 2006/0224356 | A1 | 10/2006 | Castelli et al. |
| 2006/0242214 | A1* | 10/2006 | Tominaga ............... G06F 18/00 708/200 |
| 2010/0205039 | A1 | 8/2010 | Basak et al. |
| 2015/0377935 | A1 | 12/2015 | Kuhns et al. |
| 2017/0046309 | A1 | 2/2017 | Hubauer et al. |

(Continued)

FOREIGN PATENT DOCUMENTS

| EP | 2410438 A1 | 1/2012 |
| WO | 2015/059272 A1 | 4/2015 |

(Continued)

OTHER PUBLICATIONS

International Search Report for PCT Application No. PCT/JP2018/029269, dated Oct. 30, 2018.

(Continued)

*Primary Examiner* — John H Le
(74) *Attorney, Agent, or Firm* — Sughrue Mion, PLLC

(57) ABSTRACT

Provided an apparatus configured to calculate a periodicity of time series data, generate a plurality of subsequences, from the time series data, a length of each subsequence set to the periodicity, calculate feature values of the plurality of subsequences; categorize the plurality of subsequences, based on the feature values thereof, into one or more groups, find a periodicity of the subsequences belonging in common to one group, based on an occurrence order of the subsequences belonging in common to the one group and perform missing event detection by identifying the subsequence, occurrence of which is expected according to the periodicity of the subsequences belonging in common to the one group, but not found.

20 Claims, 13 Drawing Sheets

(56) References Cited

U.S. PATENT DOCUMENTS

2017/0132523 A1    5/2017   Zhang et al.

FOREIGN PATENT DOCUMENTS

| WO | 2017/083148 A1 | 5/2017 |
| WO | 2018/092073 A1 | 5/2018 |

OTHER PUBLICATIONS

Written opinion for PCT Application No. PCT/JP2018/029269, dated Oct. 30, 2018.

Michail Vlachos, Philip Yu, Vittorio Castelli, "On Periodicity Detection and Structural Periodic Similarity," IBM, Proceedings of the 2005 SIAM International Conference on Data Mining.

Izakian, Hesam and Pedrycz, Witold, "Anomaly Detection in Time Series Data using a Fuzzy C-Means Clustering", 2013 Joint IFSA World Congress and NAFIPS Annual Meeting, Sep. 26, 2013, pp. 1513-1518, <DOI : 10.1109/IFSA-NAFIPS.2013.6608627>.

Basha, Rawshan and Ameen, Jamal, "Unusual sub-sequence identifications in time series with periodicity", International Journal of Innovative Computing, Information & Control (IJICIC), vol. 3, No. 2, Apr. 2007,pp. 471-480, [Retrieved on Oct. 16, 2018], Internet:<URL:https://www.researchgate.net/publication/228366457>.

\* cited by examiner

K columns $$A = \begin{bmatrix} 1 & 0 & \cdots & 0 \\ 0 & 1 & \cdots & 0 \\ 0 & 0 & \cdots & 0 \\ 0 & 0 & & 0 \\ 1 & 0 & \cdots & 0 \\ \vdots & \vdots & & \vdots \\ 0 & 0 & & 1 \end{bmatrix}$$

M rows 3 columns $$A = \begin{bmatrix} 1 & 0 & 0 \\ 1 & 0 & 0 \\ 0 & 0 & 1 \\ 0 & 1 & 0 \\ 1 & 0 & 0 \\ 1 & 0 & 0 \\ 0 & 0 & 1 \\ 0 & 1 & 0 \\ & \cdots & \\ 0 & 1 & 0 \end{bmatrix}$$

EVENT MONITORING APPARATUS, METHOD AND PROGRAM RECORDING MEDIUM

This application is a National Stage Entry of PCT/JP2018/029269 filed on Aug. 3, 2018, the contents of all of which are incorporated herein by reference, in their entirety.

FIELD

The present invention relates to an event monitoring apparatus, method, and non-transitory medium.

BACKGROUND

Recent years have witnessed wide spread use of a monitoring system that monitors a state (event) of an object or an entity by analyzing data acquired by one or more sensing devices (such as IoT (Internet of Things)) that measure a signal (s) of the object. Time series data of the measured signal may include information that can be assumed as an event associated with the status or behavior of the object. In the present specification, an event may have the similar meaning of state, behavior, activity, happening, occurrence, or the like, in a physical process, the time series data of which has been acquired.

Anomaly detection has been employed in a monitoring system to detect in time series data, a feature or instance, as an outlier that significantly deviates from a standard model or a learned model. The anomaly detection is also applied to identify a missed event. The missed event detection is useful in detection of failure in an object such as an electric appliance or the like, for example, as a trigger to execute analysis for finding the reason of the failure.

In anomaly detection, a cluster analysis is used. As an example, of a clustering-based approach for anomaly detection, a subsequence time series clustering can be applied to analyze change in subsequences for anomaly detection. Given a single time series, subsequences are extracted by a sliding window. More specifically, as illustrated in FIG. 13, given time series data of length N: $X=[x_1, x_2, \ldots, x_N]$ and a window length (size): w with an offset (right shift) being set to s, where w is an integer in the range of 1 to N−1 and s is a divisor of (N−w), total (N−w)/s+1 subsequences: $C_1$ to $C_{(N-w)/s+1}$ are extracted from the time series data X of length N via a window, which is each time right-shifted by s samples.

Feature value (vector) calculation of each subsequence extracted from the time series data via the sliding window is performed and clustering such as k-means or hierarchical clustering is performed on extracted subsequences, based on the feature values of the subsequences. In a clustering approach for anomaly detection, for example, a subsequence of time series data which does not belong to any cluster or a feature value of which is far from any of cluster centroids may be decided to be anomalous or an outlier.

Selection of the subsequence length is time-consuming because the selection of the subsequence length depends on either domain knowledge about data or trial and error approaches. The subsequence clustering with an incorrect window size may provide an incorrect clustering result to a subsequent (post-processing) analysis, such as event estimation or anomaly detection that uses the clustering result.

PTL (Patent Literature) 1 discloses a method for forecasting, comprising: obtaining as input at least a first future external event; predicting at least one future effect of said at least one future external event, said at least first future external event being similar to at least a first past external event; and forecasting future utilization of at least one tangible resource by superimposing events-normalized forecasted data and said at least one predicted future effect of said at least one future external event similar to said at least first past external event.

PTL 2 discloses a method for making reliable sensor data available and a device for making reliable sensor data of a system available is provided, including the following steps: receiving sensor data from at least one sensor unit that monitors a system component of the system, and processing the received sensor data using at least one stored ontology and a statistical data analysis model for generating the reliable sensor data.

Regarding a periodicity detection in time series data, PTL 3, discloses a system and a method for detecting periodic event behaviors from machine generated logging by:

capturing heterogeneous log messages, each log message including a time stamp and text content with one or more fields;

recognizing log formats from log messages;

transforming the text content into a set of time series data, one time series for each log format;

during a training phase, analyzing the set of time series data and building a category model for each periodic event type in heterogeneous logs; and during live operation, applying the category model to a stream of time series data from live heterogeneous log messages and generating a flag on a time series data point violating the category model and generating an alarm report for the corresponding log message.

In PTL 4 and NPTL (Non-Patent Literature) 1 disclose period detection by considering the information in both autocorrelation and periodogram.

PTL 1: US2010/0205039A1
PTL 2: US2017/0046309A1
PTL 3: WO2017/083148A1
PTL 4: U.S. Pat. No. 7,933,740B2
NPTL 1: "On Periodicity Detection and Structural Periodic Similarity," Michail Vlachos, Philip Yu, Vittorio Castelli, IBM, Proceedings of the 2005 SIAM International Conference on Data Mining

SUMMARY

As described above, the selection of a subsequence length in subsequence clustering depends on either domain knowledge about data or trial and error approaches and an incorrect setting of sliding window may provide an incorrect clustering result.

Accordingly, it is an object of the present invention to provide an apparatus, a method, a program recording medium, each enabling accurate detection of a periodic event and identification of a missed event in time series data.

According to an aspect of the present invention, there is provided an event monitoring apparatus comprising: a periodicity calculation unit configured to calculate a periodicity of time series data; a subsequence generation unit configured to generate a plurality of subsequences, from the time series data, a length of each subsequence set to the periodicity;

a feature extraction unit configured to calculate feature values of the plurality of subsequences; a categorization unit configured to categorize the plurality of subsequences, based on the feature values thereof, into one or more groups; and an event analysis unit configured to find a periodicity of the subsequences belonging in common to one group, based on an occurrence order of the subsequences belonging in common to the one group and to perform missing event detection by identifying the subsequence, occurrence of which is expected according to the periodicity of the subsequences belonging in common to the one group, but not found.

According to an aspect of the present invention, there is provided an event monitoring method comprising:

an event monitoring method comprising:

calculating a periodicity of time series data;

generating a plurality of subsequences, from the time series data, a length of each subsequence set to the periodicity;

calculating feature values of the plurality of subsequences;

categorizing the plurality of subsequences, based on the feature values thereof, into one or more groups;

finding a periodicity of the subsequences belonging in common to one group, based on an occurrence order of the subsequences belonging in common to the one group; and performing missing event detection by identifying the subsequence, occurrence of which is expected according to the periodicity of the subsequences belonging in common to the one group, but not found.

According to an aspect of the present invention, there is provided a computer-readable recording medium storing therein a program causing a computer to execute processing comprising:

calculating a periodicity of time series data;

generating a plurality of subsequences, from the time series data, a length of each subsequence set to the periodicity;

calculating feature values of the subsequences;

categorizing the plurality of subsequences, based on the feature values thereof, into one or more groups;

finding a periodicity of the subsequences belonging in common to one group, based on an occurrence order of the subsequences belonging in common to the one group; and performing missing event detection by identifying the subsequence, occurrence of which is expected according to the periodicity of the subsequences belonging in common to the one group, but not found. According to another aspect of the present invention, there may be also provided the above described program.

The recording medium may be a non-transitory computer-readable recording medium such as a semiconductor memory (Random Access Memory (RAM), Read Only Memory (ROM), Electrically Erasable and Programmable Read Only Memory (EEPROM), flash memory, or the like), Hard Disk Drive (HDD), Solid State Drive (SSD), Compact Disc, Digital Versatile Disc, and so forth.

According to the present invention, it is made possible to accurately detect a periodic event and thus to identify a missed event in a time series data.

DETAILED DESCRIPTION

Figure 1:
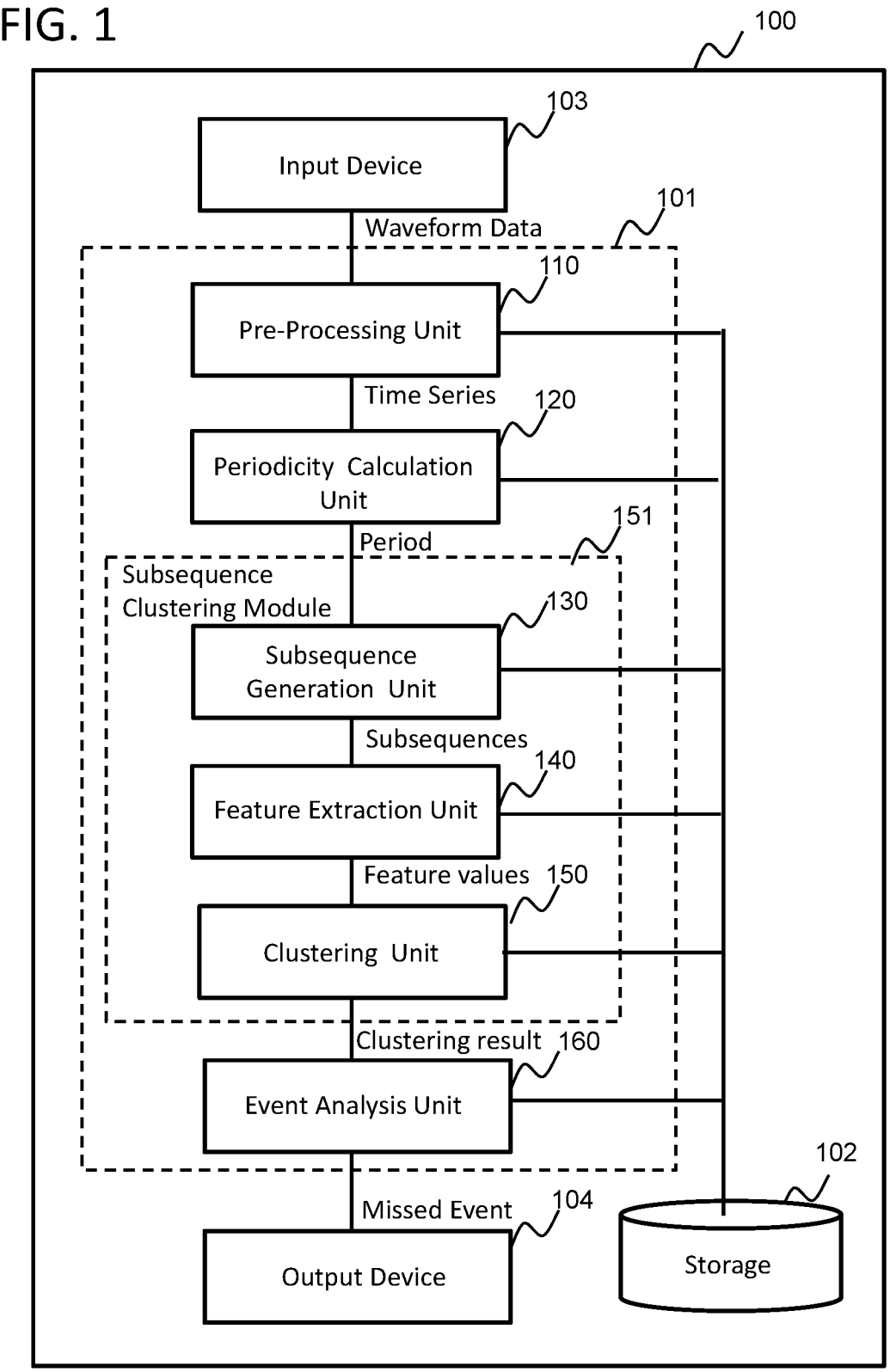
FIG. 1 is a diagram illustrating an arrangement of a first example embodiment.

The following described example embodiments. FIG. 1 is a diagram illustrating an arrangement of an event monitoring apparatus of a first example embodiment. Referring to FIG. 1, the event monitoring apparatus 100 includes a processing unit 101, a storage unit 102, an input device 103, and an output device 104.

The processing unit 101 includes a pre-processing unit 110, a periodicity calculation unit 120, a subsequence generation unit 130, a feature extraction unit 140, a clustering unit 150 and an event analysis unit 160. The subsequence generation unit 130, the feature extraction unit 140 and the clustering unit 150 constitute a subsequence clustering module 151. In FIG. 1, units 110-160 are integrated in the processing unit 101, but units 110-160 may, as a matter of course, be arranged respectively as separate units communicating with each other.

The input device 103 may include a communication unit (not shown) to communicate with a measurement device such as current sensor (not shown) or power sensor (not shown). In this case, the input device 103 is configured to receive, from the sensor, a waveform of an electric appliance to be monitored, such as consumption current or power consumption.

The pre-processing unit 110 receives the waveform data from the input device 103, performs preprocessing of the waveform data, if necessary, to generate time series data, and stores the pre-processed time series data in the storage unit 102. The pre-processing unit 110 may calculate, for example, RMS (root mean square) of an instantaneous current waveform or an instantaneous power waveform received by the input device 103. In a case where the measurement device is enabled to provide RMS data of current or power and the input device 103 is configured to receive RMS time series data, the RMS calculation by the pre-processing unit 110 can be omitted. The pre-processing unit 110 may as a matter of course perform pre-processing other than RMS calculation, such as filtering or the like.

The periodicity calculation unit 120 reads out the time series data from the storage unit 102 and finds a periodicity in the time series data.

The subsequence clustering module 151 performs subsequence time series clustering. More specifically, the subsequence generation unit 130 extracts subsequences from the time series data via a sliding window, a window size w of which is set to the periodicity.

The feature extraction unit 140 calculates, as a feature value of each subsequence, for example, power spectrum such as periodogram feature, autocorrelation, a statistical feature value(s) (at least one of mean, standard deviation, sum, median, squared sum, etc.) or the like. The feature extraction unit 140 may well calculate a feature vector including elements of a plurality kinds of feature values.

The clustering unit 150 may apply unsupervised clustering on feature values or feature vectors of the subsequences, such as a k-means clustering algorithm or the like in which the number of clusters to detect is specified in advance to cluster the subsequences into a predetermined number of clusters (groups). The clustering unit 150 may, as a matter of course, use a hierarchical clustering in which there is no need to pre-specify the number of clusters.

The feature extraction unit 140 may use feature selection which finds a subset of original variables to reduce dimension of data set (feature vector) or use data transformation that transforms data in a high-dimensional space to a space of fewer dimensions by using, for example, principal component analysis (PCA).

The event analysis unit 160 receives the clustering result output from the clustering unit 150. The clustering result may include information on the subsequence number in association with the cluster number into which the subsequence is clustered, that is, (subsequence #1, cluster #1), (subsequence #2, cluster #K), ..., (subsequence #M, cluster #2).

Figure 13:
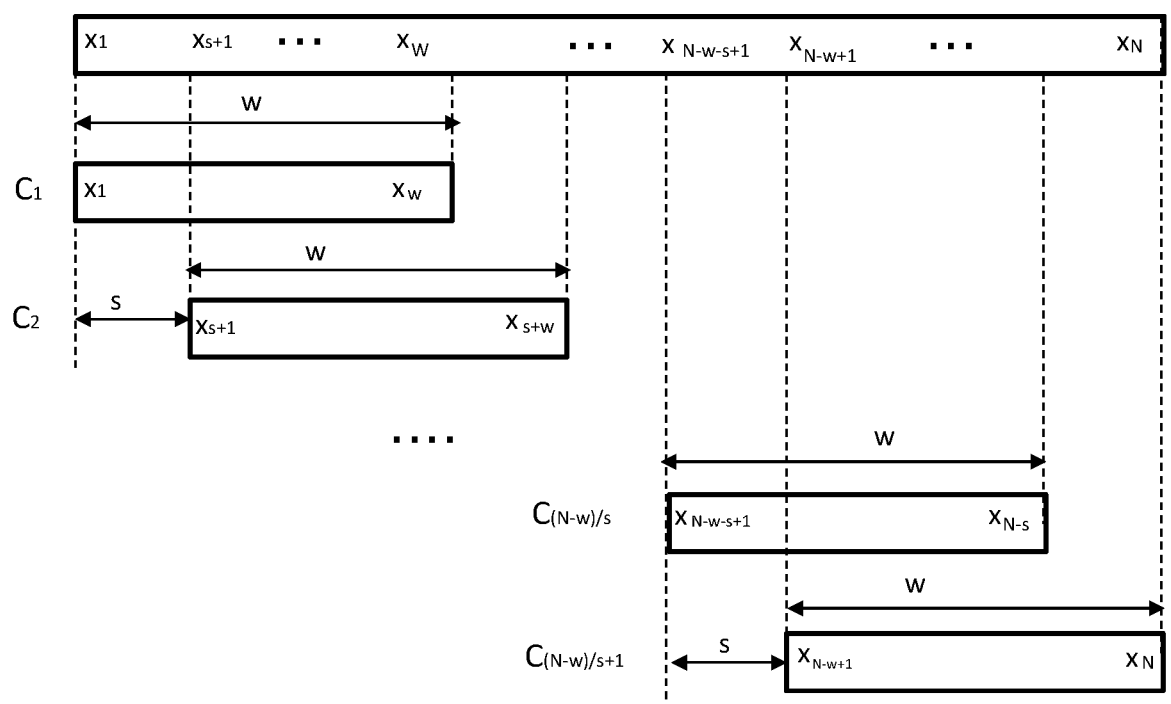
FIG. 13 is a diagram illustrating generation of subsequences via a sliding window.

The event analysis unit 160 finds a periodicity of the subsequences belonging to the same cluster, based on an occurrence order of the subsequences belonging to the same cluster. The event analysis unit 160 may perform missing event detection by identifying the subsequence, occurrence of which is expected according to the periodicity of the subsequences belonging in common to one cluster, but not found, because clustering of the subsequence into the one group is not performed. The event analysis unit 160 creates, based on the clustering result, an incidence matrix (binary matrix) A. An element $a(i,j)$ of i-th row and j-th column of the incidence matrix A takes a value 1, if i-th subsequence belongs to the cluster #j, otherwise 0, where $1<=i<=M$, and $1<=j<=K$, M is the number of subsequences, K is the number of clusters. In an example of FIG. 13, the number of subsequences is $M=(N-w)/s+1$, for time series data $X=[x_1, x_2, \ldots, x_N]$ with a window length(size) w and an offset s (right shift).

Each cluster, that is, each column of the incidence matrix A may correspond to an event or state. The event analysis unit 160 calculates a periodicity for each column (column-wise periodicity) in the incidence matrix A.

The event analysis unit 160 calculates the column-wise periodicity by finding a periodicity of an occurrence of a value 1, from the first row to M-th row in the column. The event analysis unit 160 stores the column-wise periodicity in a storage unit 102. Let's assume that the calculated periodicity of j-th column of the binary matrix is $P_j$, and a value of an element $a(i,j)$ in the incidence matrix A is 1. If a value of an element $a(i+P_j,j)$ (where $(i+P_j)<=M$) is not 1 but 0, the event analysis unit 160 recognizes a missing of the event and issues an alert. In the incidence matrix A, rows and columns may be interchanged, that is, clusters in rows and subsequences in columns.

The output device 104 outputs a missed event. The output device 104 may include a display unit to output the missed event or a communication unit to transmit the missed event via a network to a terminal of a maintenance personnel.

Figure 2:
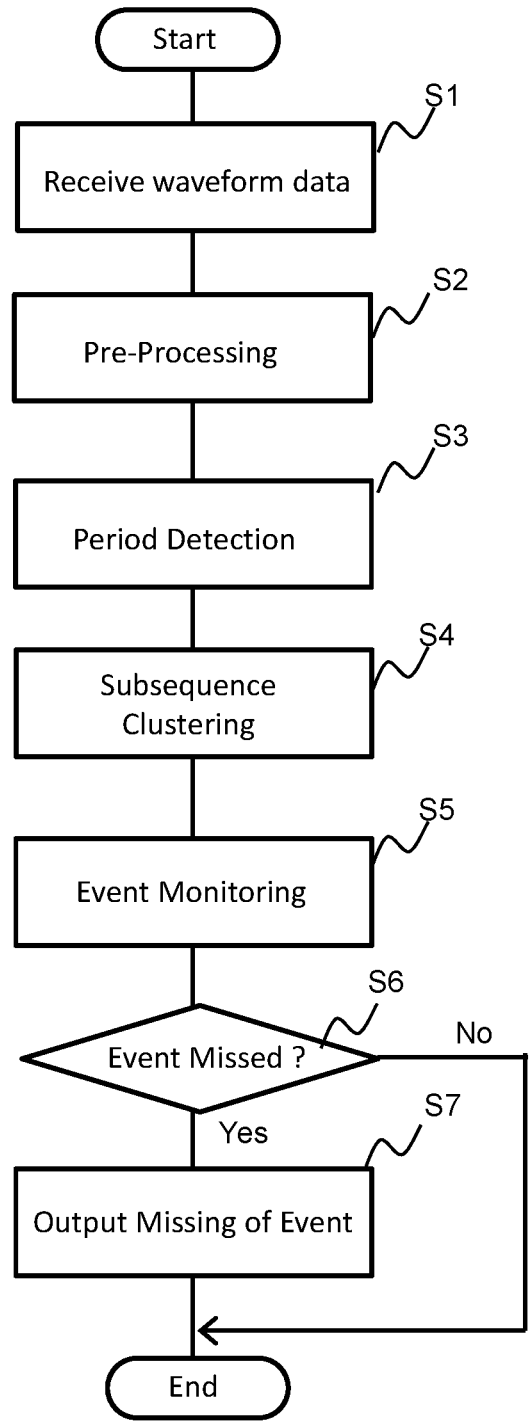
FIG. 2 is a flow chart illustrating an operation of the first example embodiment.

FIG. 2 is a flowchart illustrating an operation of the example embodiment. Referring to FIG. 2, the event monitoring apparatus 100 receives waveform data from a measurement unit that measures a signal of an electric appliance such as a consumption current or power (Step S1).

The event monitoring apparatus 100 performs pre-processing of the waveform data to generate time series data (Step S2).

The event monitoring apparatus 100 performs periodicity detection of time series data (Step S3).

The event monitoring apparatus 100 performs subsequence time series clustering (Step S4).

The event monitoring apparatus 100 performs event monitoring based on the result of the subsequence time series clustering (Step S5).

When finding missed event (Yes branch of Step S6), the event monitoring apparatus 100 outputs notification of missing of event (Step S7).

Figure 3:
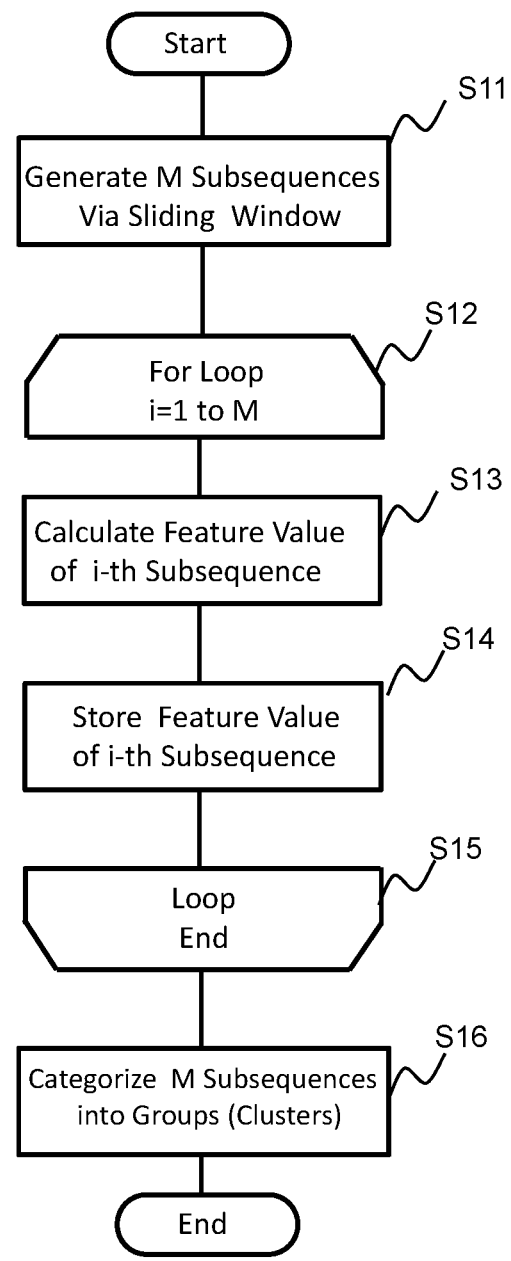
FIG. 3 is a flow chart illustrating an operation of the first example embodiment.

FIG. 3 is a flow chart illustrating an operation of the subsequence clustering module 151 in FIG. 1. Referring to FIG. 3, the subsequence generation unit 130 generates subsequences from the time series data by using a sliding window, a size of which is set to the periodicity obtained by the periodicity calculation unit 120 (Step S11).

Assuming that M subsequences have been extracted from the time series data by the subsequence generation unit 130, the feature extraction unit 140 calculates a feature values of the M subsequences (Step S12-S15).

The feature extraction unit 140 may calculate, as a feature value of each subsequence, for example, power spectrum such as periodogram feature, autocorrelation, or a statistical feature value (mean, standard deviation, sum, median, squared sum or the like). The feature extraction unit 140 may calculate a feature vector including a plurality of elements constituted by a plurality kinds of feature values.

The clustering unit 150 may use unsupervised clustering, such as a k-means clustering algorithm, or hierarchical clustering to categorize the M subsequences, based on the feature values of the M subsequences, into a predetermined number of groups (clusters) (Step S16).

Figure 4:
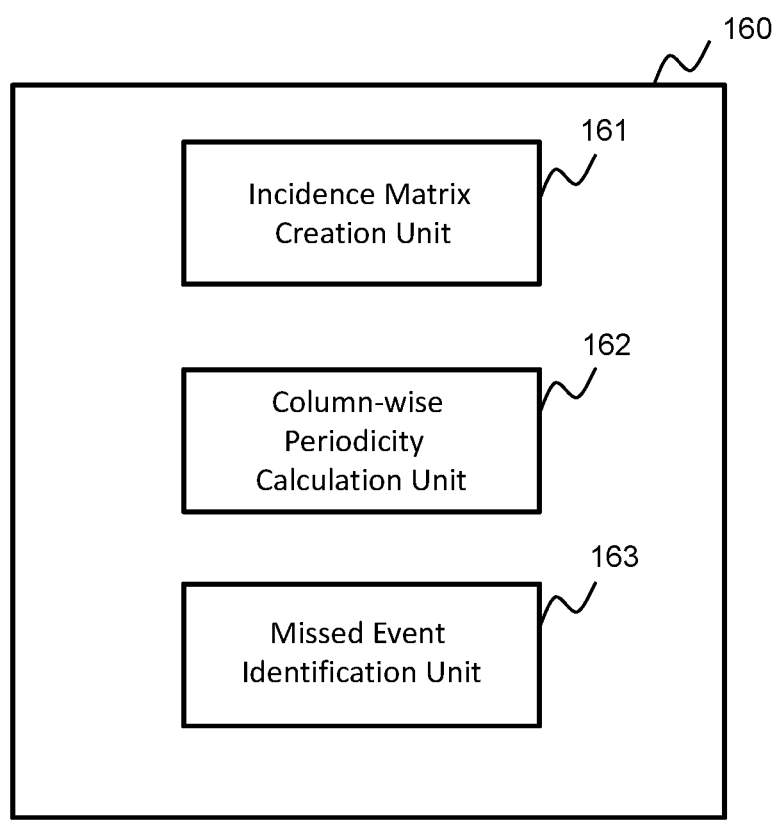
FIG. 4 is a diagram illustrating an arrangement of an event analysis unit of the first example embodiment.

FIG. 4 is a diagram illustrating an arrangement of the event analysis unit 160. The event analysis unit 160 includes an incidence matrix creation unit 161, a column-wise periodicity calculation unit 162, and a missed event identification unit 163.

Figure 5:
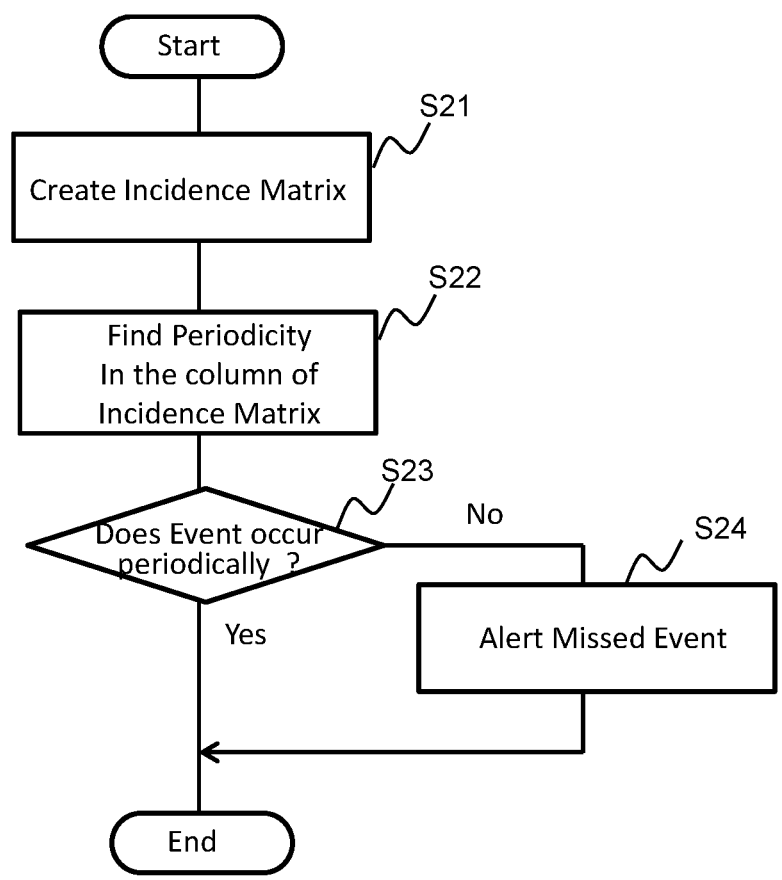
FIG. 5 is a flow chart illustrating an operation of an event analysis unit.
Figures 6A, 6B, 6C:
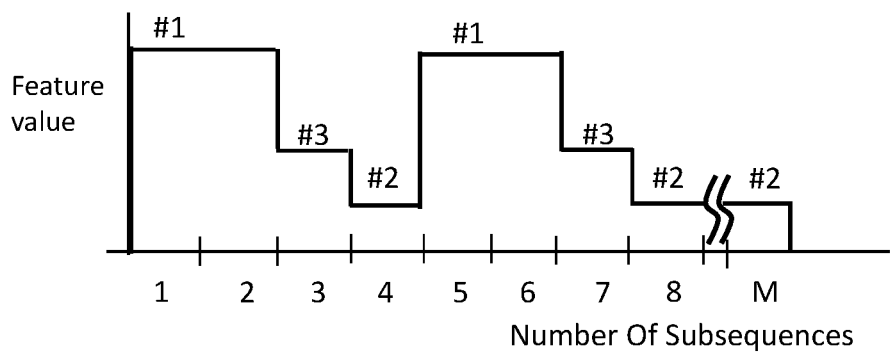
FIG. 6A-FIG. 6C illustrate examples of an incidence matrix.

FIG. 5 is a flow chart illustrating an operation of the event analysis unit 160 of FIG. 4. The incidence matrix creation unit 161 creates an incidence matrix (binary matrix) (Step S21). FIG. 6A illustrates an example of the incidence matrix A with M number of rows and K number of columns. Rows and columns of the incidence matrix A corresponds to the subsequence and cluster (group). An element of i-th row and j-th column of the matrix A: $a(i,j)$ takes a value 1, if i-th subsequence is in the cluster j, otherwise 0, where $1<=i<=M$, and $1<=j<=K$, M is the total number of subsequences, K is the total number of clusters. Here, 1st to K-th clusters are regarded to correspond to respective events.

The columns-wise periodicity calculation unit 162 calculates a periodicity of occurrence of the value 1 in each column of the incidence matrix (Step S22). More specifically, the columns-wise periodicity calculation unit 162 scans elements of the incidence matrix A, for example, from 1st row to M-th row in each column to estimate a periodicity of an occurrence of the value 1.

FIG. 6B illustrates an example of the incidence matrix A of 3 columns. In FIG. 6B, the column-wise periodicity in each of 1st to 3rd columns is 4.

With k-means clustering, one data (subsequence) is classified into one cluster and one element out of 3-elements in the same row in the incidence matrix A takes a value of 1.

FIG. 6C corresponds to the incidence matrix A of FIG. 6B and illustrates transition of events of the subsequences. In FIG. 6C, a horizontal axis indicates the cluster number and a vertical axis indicates a feature value. Here, an event number corresponds to a cluster number. The 1st and 2nd subsequences are both clustered into the cluster #1 (event #1), 3rd subsequence is clustered into the cluster #3 (event #3), and 4th subsequence is clustered into the cluster #2

(event #2). When it is assumed that the feature value in FIG. 6C is a power consumption of an electric appliance, it is possible to correspond the event #1, #2, and #3 with high power, low power and middle (normal) power operations of the electric appliance. The electric appliance has an operation cycle consisting of the high power, middle power and low power operations. may be a manufacturing apparatus arranged in a manufacturing line in a factory, though not limited thereto.

The missed event identification unit 163 checks whether or not the event occurs periodically (FIG. 5, Step S23). The missed event identification unit 163 identifies missing of a relevant event, when the element, which is expected to take a value of 1 in the incidence matrix A, takes a value of 0.

In the case of the incidence matrix A of FIG. 6B, when an element of [4*(m−1)+1], or [4*(m−1)+2] th-row where m=1, 2, . . . , 3*m<=M in the 1st column takes a value 0, instead of a value 1, the missed event identification unit 163 may conclude that the corresponding event clustered in the 1st cluster (cluster #1) fails to occur or is missed. In the same manner, when an element of [4*(m−1)+3] or [4*(m−1)+4] th-row in the 2nd or 3rd column takes a value 0, instead of a value 1, the missed event identification unit 163 may conclude that the corresponding event clustered in the 2nd or 3rd cluster fails to occur or is missed. When the missed event identification unit 163 identifies a missing event, the missed event identification unit 163 may notify the missing of event (alert) to the output device 104 (FIG. 5, Step S24). The output device 104 may output an occurrence of missed event on a display or notify alert by sound.

When the columns-wise periodicity calculation unit 162 cannot find periodicity in a column in the incidence matrix A, the missed event identification unit 163 does not perform missed event identification and the event analysis unit 160 may output such message as "No event periodicity found".

In the example embodiment as described with FIG. 1, the periodicity calculation unit 120 can use any algorithm such as a power spectrum analysis to find a periodicity of the time series data.

Assuming that the time series data consist of x(0), x(T), x(2*T), . . . , x((N−1)*T), where T is a sampling interval. When x(n*T) is denoted by x(n), DFT (Discrete Fourier Transform) of the time series data is given as follows:

$$X(k) = \sum_{n=0}^{N-1} x(n)e^{-\frac{j2\pi kn}{N}}, \quad (1)$$

$$k = 0, 1, \ldots, N-1$$

where X(k) is a complex DFT coefficient at a frequency k/(T*N).

IDFT (Inverse DFT) is given by $$x(n) = \frac{1}{N}\sum_{n=0}^{N-1} X(k)e^{\frac{j2\pi kn}{N}}, \quad (2)$$

$$k = 0, 1, \ldots, N-1$$

The periodogram $I(f_k)$ is given by $$I(f_k) = \frac{1}{N}\|X(k)\|^2 \quad (3)$$

where $f_k$ is k/(N*T).

To find a periodicity, a frequency bin at which the maximum power spectral density (maximum peak) resides in the periodogram is selected. When the maximum power spectral density (maximum peak) is found to occur at a k-th DFT bin (i.e., at frequency: $f_k$=k/(N*T)), this bin corresponds to a period [N*T/k, N*T/(k−1)] in a time domain. The resolution of the periodogram for a longer period (for a smaller value of k) becomes course. When the time series data has a frequency, which is not integer multiple of the DFT bin 1/(N*T), the power spectrum of this frequency is dispersed over the entire spectrum.

The periodicity in the time series data can be estimated by calculating a circular autocorrelation function (ACF) of the time series data. ACF for lag 1 is given by $$ACF(l) = \sum_{n=0}^{N-1} x(n) \cdot x(n+l) \quad (4)$$

The ACF can be calculated by the IDFT of the power spectrum $\|X(k)\|^2$.

Figure 7:
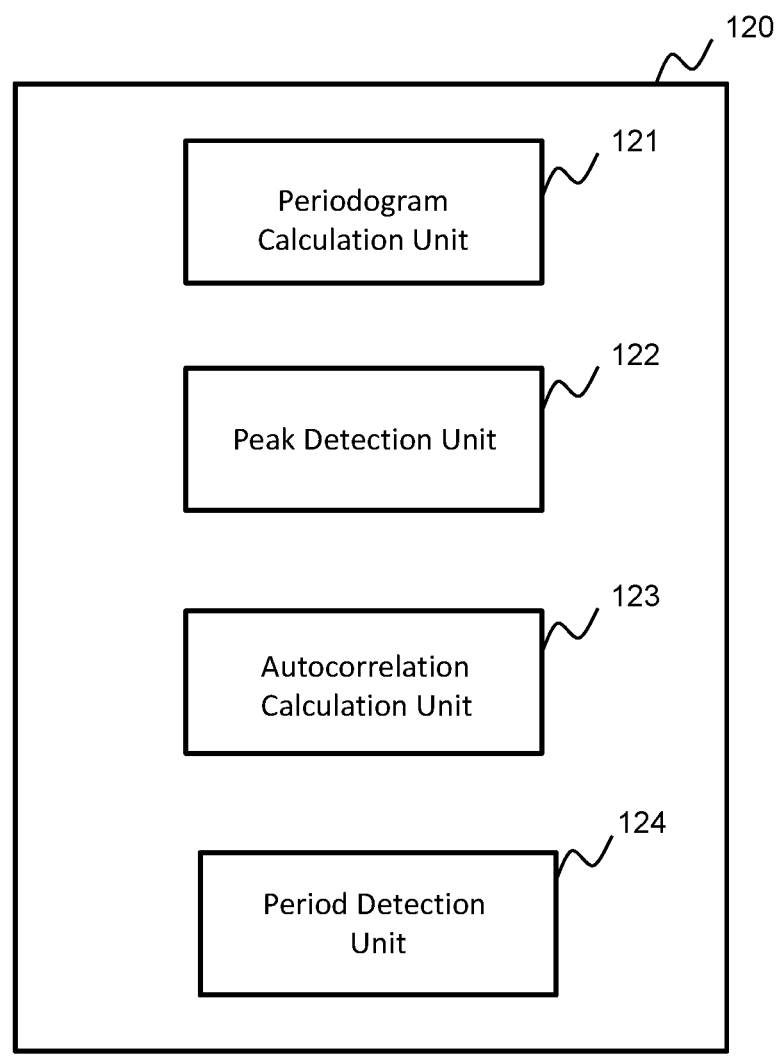
FIG. 7 is a diagram illustrating an arrangement of a periodicity calculation unit of the first example embodiment.

The following describes the combination algorithm of the periodogram and ACF to find a periodicity in the time series data. FIG. 7 illustrates an example of an arrangement of the periodicity calculation unit 120. The periodicity calculation unit 120 includes a periodogram calculation unit 121, a peak detection unit 122, an autocorrelation function calculation unit 123, and a period detection unit 124.

Figure 8:
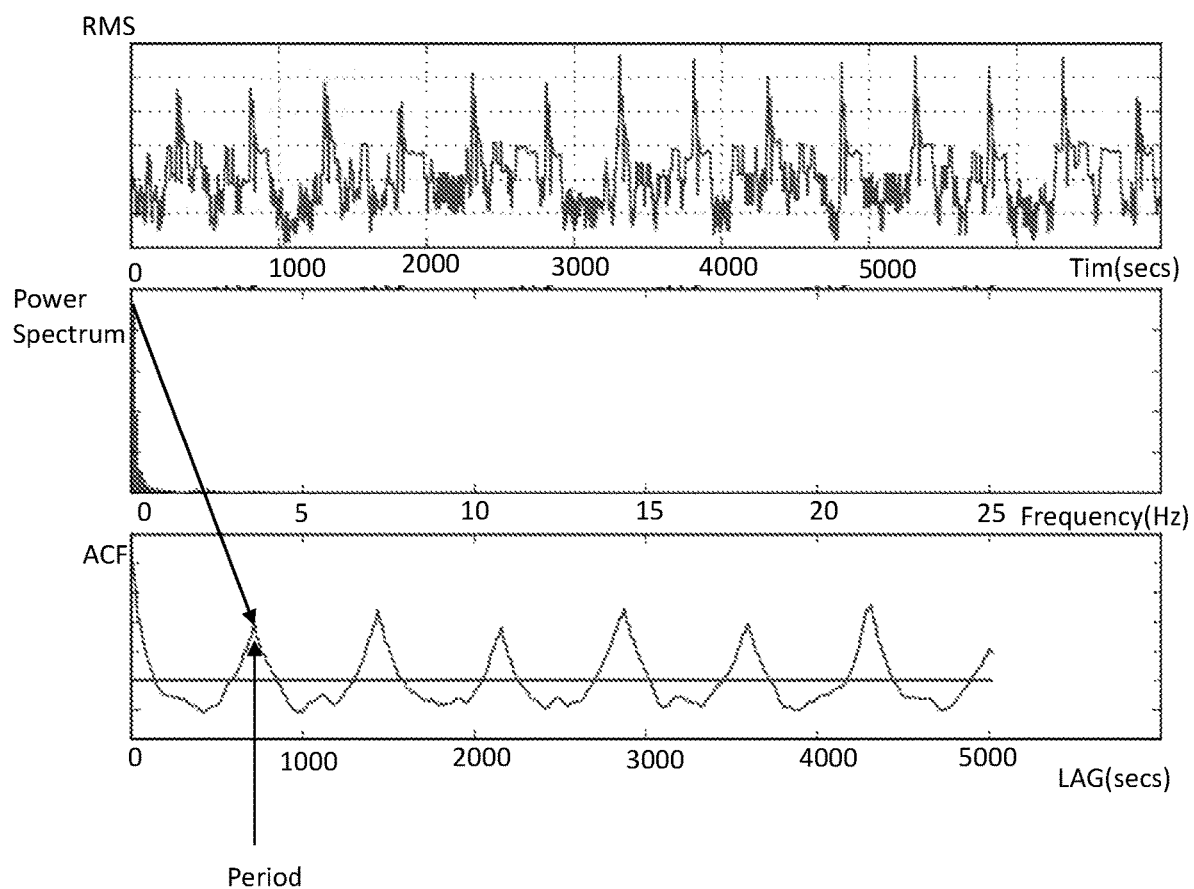
FIG. 8 is a diagram illustrating an example of time series data, periodogram and auto-correlation function (ACF).

FIG. 8 shows the time series data of RMS values, power spectrum of the time series data and the autocorrelation function of the time series data. The first peak in the autocorrelation function is indicated as a period of the RMS time series data by an arrow.

Figure 9:
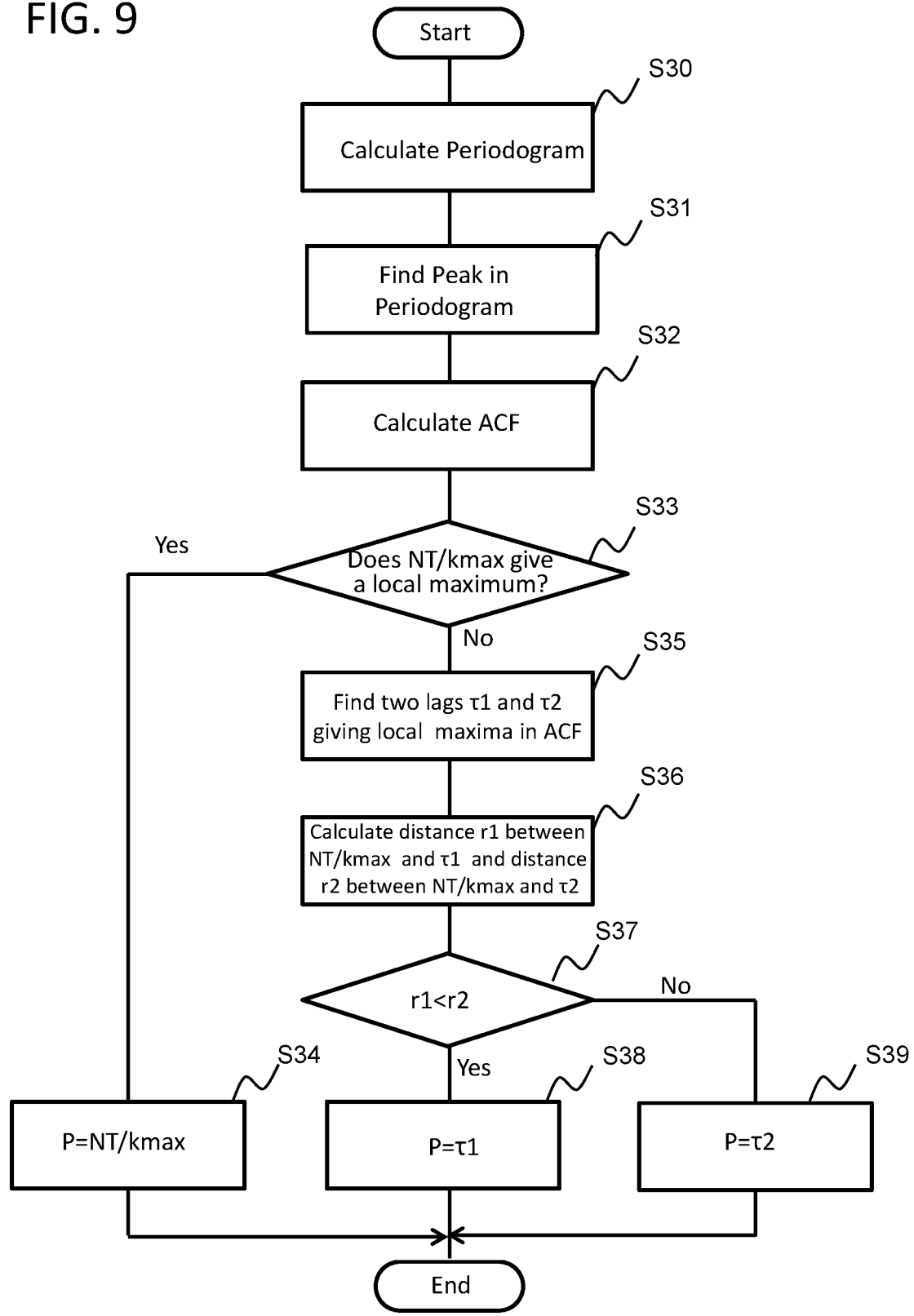
FIG. 9 is a flow chart illustrating an operation of the periodicity calculation unit.

FIG. 9 is a flowchart for explaining the operation of the periodicity calculation unit 120. The periodogram calculation unit 121 calculates a periodogram of the time series data (Step S30).

The peak detection unit 122 detects a DFT bin that gives a maximum power spectrum density in the periodogram (Step S31).

$$k_{max} = \arg\max_k \frac{1}{N}\|X(k)\|^2, \quad (5)$$

$$k \in \left\{0, 1, \ldots, \left\lfloor\frac{N-1}{2}\right\rfloor\right\}$$

where $$\left\lfloor\frac{N-1}{2}\right\rfloor$$

gives the greatest integer less than or equal to (N−1)/2.

The period detection unit 124 obtains a time point $N*T/k_{max}$, the inverse number of which corresponds to the frequency at which the power spectrum density takes the maximum value. If a value of ACF at a time point (lag) $N*T/k_{max}$: $ACF(N*T/k_{max})$ takes a peak value (local maximum) (Yes branch of Step S33), the periodicity is set to $N*T/k_{max}$ (Step S34).

There is another case wherein a period is latent in the autocorrelation graph because it has a lower amplitude but the peak corresponding to the period is very obvious (takes a maximum peak) in the periodogram, as described in NPTL 1. In this case, the selection of $N*T/k_{max}$ as a periodicity, which is derived from the periodogram, is effective.

If a value of ACF at a lag of $N*T/k_{max}$: $ACF(N*T/k_{max})$ is not a peak value (local maximum) (No branch of Step S34), the period detection unit 124 finds two local maxima which occur at time points (lags) τ1 and τ2, with $N*T/k_{max}$ sandwiched between τ1 and τ2, in the ACF (Step S35). The time points (lags) τ1 and τ2 giving two local maxima (also termed as relative local maxima) are both neighboring to $N*T/k_{max}$ which is a time point corresponding to the DFT frequency bin of the maximum peak (maximum power) in the periodogram. The time points (lags) τ1 and τ2 giving two local maxima are not necessarily on both sides against $N*T/k_{max}$. In finding local maxima in the ACF, the period detection unit 124 may selects one or more local maxima which are more than a predetermined threshold level in the ACF. The number of local maxima selected is, as a matter of course, not limited to two.

The period detection unit 124 calculates a distance r1 between $N*T/k_{max}$ and τ1 and a distance r2 between $N*T/k_{max}$ and τ2 (Step 36).

$$r1 = \left| \frac{N \cdot T}{k_{max}} - \tau 1 \right|, \quad (6)$$

$$r2 = \left| \tau 2 - \frac{N \cdot T}{k_{max}} \right|$$

If r1<=r2, then the periodicity p=τ1, (Step S38), else p=τ2 (Step S39).

Figure 10A:
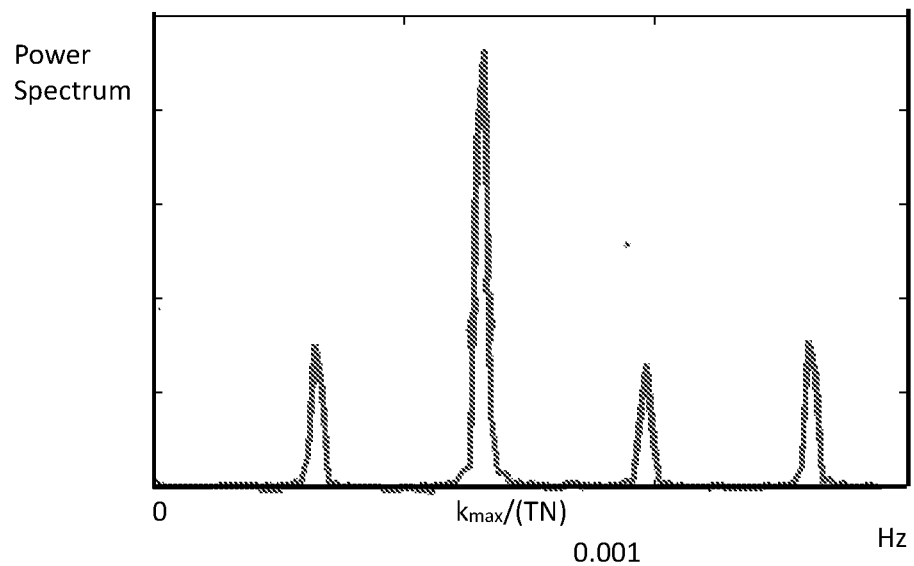
FIG. 10A and FIG. 10B are diagrams illustrating periodogram and auto-correlation function (ACF) for explaining an operation of the periodicity calculation unit.
Figure 10B:
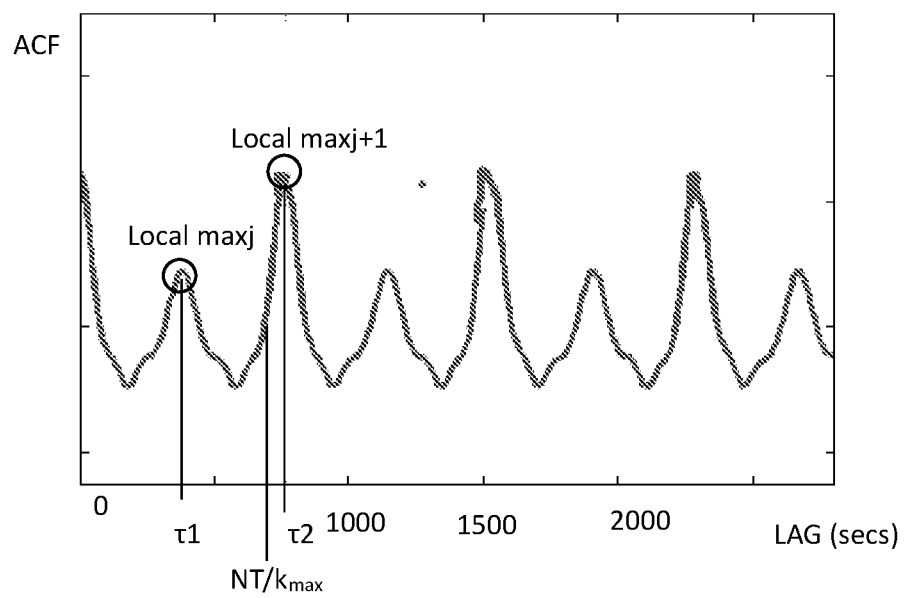

FIG. 10A and FIG. 10B are diagrams for explaining the operation of the period detection unit 124. In FIG. 10A, the power spectrum has a peak at a DFT frequency bin of $k_{max}/(N*T)$. The period detection unit 124 finds time points (lags) τ1 and τ2 giving two separate local maxima (Local $max_j$ and local $max_{j+1}$) in the ACF, with the time point: $N*T/k_{max}$ there between, as illustrated in FIG. 10B. In an example of FIG. 10B, since r1>r2, the periodicity P is set to τ2.

In the first example embodiment, the unsupervised clustering is employed, but the present invention is not limited to the unsupervised clustering. The unsupervised clustering can well be replaced by a supervised clustering (semi-supervised clustering) or a supervised classification, such as SVM (support vector machine) or NN (neural network). In the second example embodiment, the supervised classification is employed, though not limited thereto. The supervised classification uses a set of labeled training data to train a classifier. As a result of the training, the learned classification model is obtained.

Figure 11:
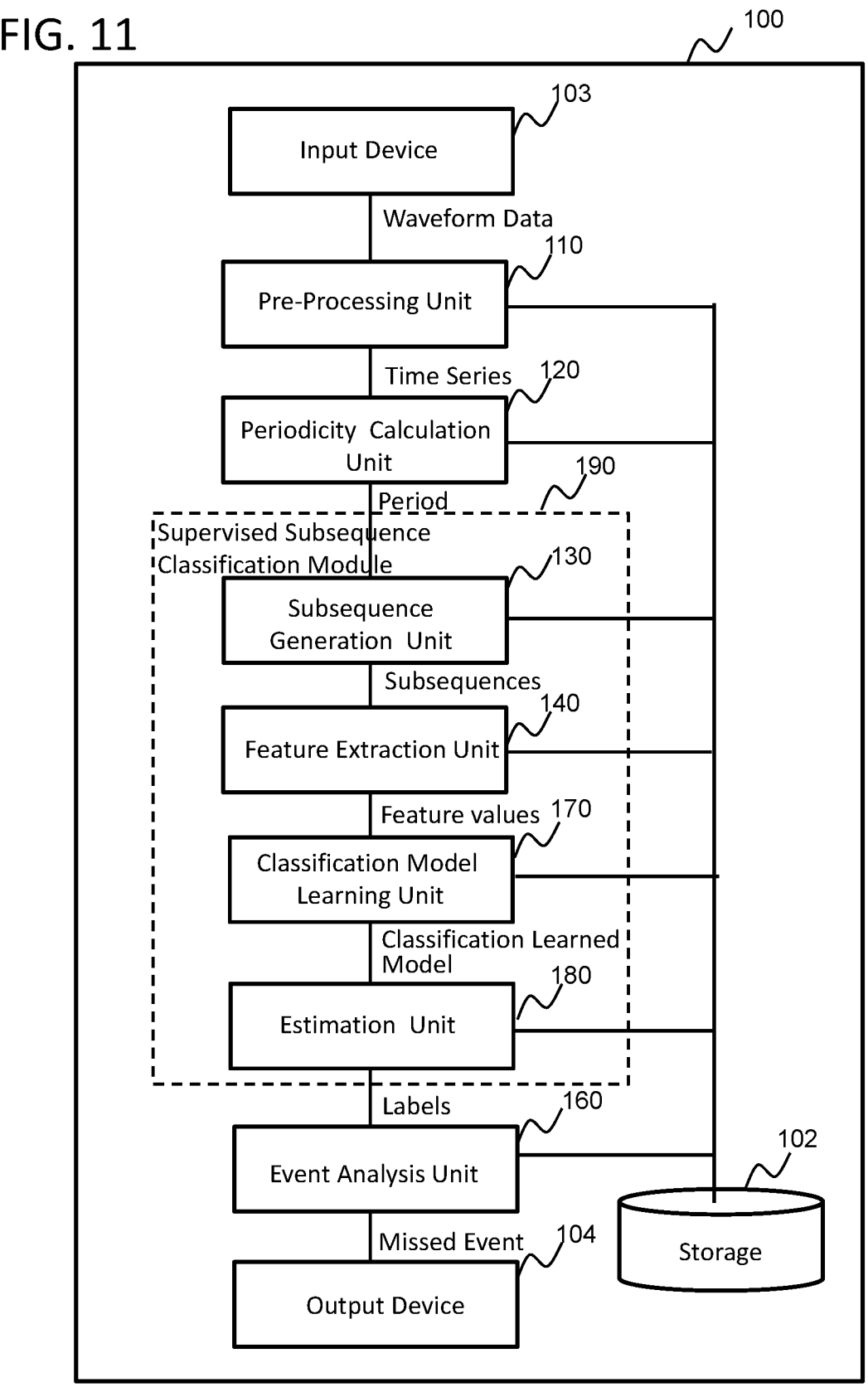
FIG. 11 is a diagram illustrating an arrangement of a second example embodiment.

FIG. 11 illustrates an arrangement of the apparatus 100 of the second example embodiment. The subsequence clustering module 151 in the first example embodiment is replaced by a supervised subsequence classification module 190. The supervised subsequence classification module 190 includes a subsequence generation unit 130, a feature extraction unit 140, a classification model learning unit 170 and an estimation unit 180. The subsequence generation unit 130 and the feature extraction unit 140 are the same as those of the first example embodiment.

The classification model learning unit 170 uses set of labeled training data (features of the subsequences) to obtain a learned classification model. The learned classification model is stored in the storage 102.

The estimation unit 180 uses a learned classification model to estimate (predict) classification of features of the subsequences extracted via a sliding window from the time series data to be analyzed. In a case where the estimation unit 180 outputs a label as the classification result, the incidence matrix creation unit 161 of the event analysis unit 160 creates an incidence matrix, using labels output by the estimation unit 180. Labeling of each column of the incidence matrix A may be done by the incidence matrix creation unit 161, that is, each column of the incidence matrix A may be identified by a label, such as label1, label2, and label3, corresponding to columns 1, 2 and 3, respectively. The operation of the column-wise periodicity calculation unit 162 and missed event identification unit 163 in the event analysis unit 160 are the same as those of the first example embodiment and the description thereof is omitted.

Figure 12:
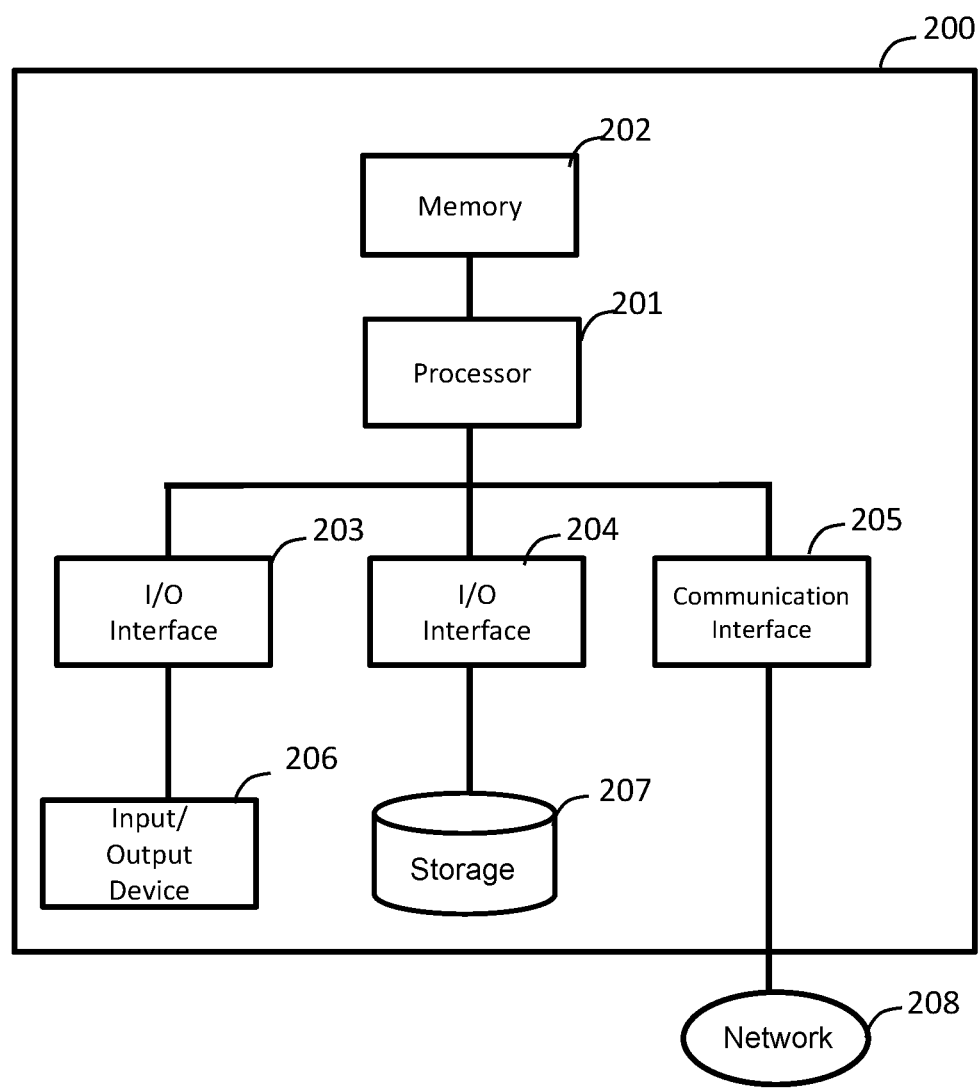
FIG. 12 is a diagram illustrating an arrangement of a third example embodiment.

The event monitoring apparatus 100 (or system) described in the above example embodiments may be implemented on a computer system such as a server system (or a cloud system), as illustrated in FIG. 12, for example. Referring to FIG. 12, a computer system 200, such as a server system, includes a processor (Central Processing Unit) 201, a memory 202 that may include, for example, a semiconductor memory (for example, Random Access Memory (RAM), Read Only Memory (ROM), Electrically Erasable and Programmable ROM (EEPROM), and/or a storage device including at least one of Hard Disk Drive (HDD), Compact Disc (CD), Digital Versatile Disc (DVD) and so forth, I/O interfaces 203 and 204, a communication interface 205, an input/output device 206 (display terminal) which is connected to the processor 201 via the I/O interfaces 203, and a storage apparatus 207 which is connected to the processor 201 via the I/O interfaces 204.

The computer system 200 can connect to a network 208 such as LAN (Local Area Network) and/or WAN (Wide Area Network) via the communication interface 205 that may include one or more network interface controllers (NICs). A program for executing the process of the event monitoring apparatus 100 in FIG. 1 or FIG. 11 is stored in a storage 207 and the processor 201 reads the program into a main memory provided in the memory 202, from the storage 207 to execute the program to realize the event monitoring function according to the example embodiments.

The disclosure of the aforementioned PTLs 1-4 and NPTL 1 is incorporated by reference herein. The particular example embodiments or examples may be modified or adjusted within the scope of the entire disclosure of the present invention, inclusive of claims, based on the fundamental technical concept of the invention. In addition, a variety of combinations or selections of elements disclosed herein may be used within the concept of the claims. That is, the present invention may encompass a wide variety of modifications or corrections that may occur to those skilled in the art in accordance with the entire disclosure of the present invention, inclusive of claims and the technical concept of the present invention.

What is claimed is:

1. An event monitoring apparatus comprising:
a processor; and
a memory in circuit communication with the processor, wherein the processor is configured to execute program instructions stored in the memory to:
calculate a periodicity of time series data;
generate a plurality of subsequences, from the time series data, a length of each subsequence set to the periodicity;
calculate feature values of the plurality of subsequences;
categorize the plurality of subsequences, based on the feature values thereof, into one or more groups; and
find a periodicity of the subsequences belonging in common to one group, based on an occurrence order of the subsequences belonging in common to the one group and to perform missing event detection by identifying the subsequence, occurrence of which is expected according to the periodicity of the subsequences belonging in common to the one group, but not found.

2. The event monitoring apparatus according to claim 1, wherein the processor is configured to execute the program instructions stored in the memory to:
create an incidence matrix, each element thereof defining relation of the subsequence in a row with each group in a column to take a value 1 if the subsequence is categorized in the group, else take value 0;
calculate a periodicity of occurrence of the value 1 in each column of the incidence matrix; and
identify a missed event when an element of the incidence matrix that is expected to take a value 1, based on the periodicity in the column that the element belongs, takes a value 0.

3. The event monitoring apparatus according to claim 2, wherein the incidence matrix has the number of rows set to the number of the subsequences and the number of columns set to the number of groups into which the subsequences are categorized, wherein an element at i-th row and j-th column of the incidence matrix takes a value 1 if the i-th subsequence is categorized in the j-the group, else takes a value 0, where $1<=i<=$ the number of rows and $1<=j<=$ the number of columns.

4. The event monitoring apparatus according to claim 1, wherein the processor is configured to execute the program instructions stored in the memory to
in categorizing the plurality of subsequences, perform clustering of the plurality of subsequences, based on the feature values thereof, into one or more groups.

5. The event monitoring apparatus according to claim 1, wherein the processor is configured to execute the program instructions stored in the memory to
in categorizing the plurality of subsequences, classify the plurality of subsequences, based on the feature values thereof, into one or more groups.

6. The event monitoring apparatus according to claim 5, wherein the processor is configured to execute the program instructions stored in the memory to:
in classifying the plurality of subsequences, learn a classification model using training subsequences with the periodicity; and
estimate, using the classification model, a group into which the subsequence is classified based on the feature thereof.

7. The event monitoring apparatus according to claim 1, wherein the processor is configured to execute the program instructions stored in the memory to
calculate the periodicity of the times series data using at least one of a periodogram of the time series data and an autocorrelation of the time series data.

8. The event monitoring apparatus according to claim 7, wherein the processor is configured to execute the program instructions stored in the memory to
find a maximum peak in the periodogram, and detect, in the autocorrelation, one or more peaks which occur at one or more lags neighboring to a time corresponding to a frequency of the maximum peak in the periodogram to select the lag as the periodicity, based on a distance between the lag corresponding to the peak and the time corresponding to the frequency of the maximum peak in the periodogram.

9. A computer-based method to implement event monitoring, the method comprising:
calculating a periodicity of time series data;
generating a plurality of subsequences, from the time series data, a length of each subsequence set to the periodicity;
calculating feature values of the plurality of subsequences;
categorizing the plurality of subsequences, based on the feature values thereof, into one or more groups;
finding a periodicity of the subsequences belonging in common to one group, based on an occurrence order of the subsequences belonging in common to the one group; and
performing missing event detection by identifying the subsequence, occurrence of which is expected according to the periodicity of the subsequences belonging in common to the one group, but not found.

10. The computer-based method according to claim 9, wherein the finding a periodicity of the subsequences comprises:
creating an incidence matrix, each element thereof defining relation of the subsequence in a row with each group in a column to take a value 1 if the subsequence is categorized in the group, else take value 0; and
calculating a column-wise periodicity of occurrence of the value 1 in each column of the incidence matrix, and
the performing missing event detection comprises
identifying a missed event when an element of the incidence matrix that is expected to take a value 1, based on the periodicity in the column that the element belongs, takes a value 0.

11. The computer-based method according to claim 10, wherein the incidence matrix has the number of rows set to the number of the subsequences and the number of columns set to the number of groups into which the subsequences are categorized, wherein an element at i-th row and j-th column of the incidence matrix takes a value 1 if the i-th subsequence is categorized in the j-the group, else takes a value 0, where $1<=i<=$ the number of rows and $1<=j<=$ the number of columns.

12. The computer-based method according to claim 9, wherein the categorizing the plurality of subsequences comprises
performing clustering of the plurality of subsequences, based on the feature values thereof, into one or more groups.

13. The computer-based method according to claim 9, wherein the categorizing the plurality of subsequences comprises
classifying the plurality of subsequences, based on the feature values thereof, into one or more groups.

14. The computer-based method according to claim 13, wherein the classifying the plurality of subsequences comprises
learning a classification model using training subsequences with the periodicity; and
estimating, using the classification model, a group into which the subsequence is classified based on the feature thereof.

15. The computer-based method according to claim 9, wherein the calculating a periodicity comprises
calculating the periodicity of the times series data, using at least one of a periodogram of the time series data and an autocorrelation of the time series data.

16. The computer-based method according to claim 15, wherein the calculating the periodicity of the times series data comprises:
finding a maximum peak in the periodogram of the time series, and
detecting, in the autocorrelation of the time series, one or more peaks which occur at one or more lags neighboring to a time corresponding to a frequency of the maximum peak in the periodogram to select the lag as the periodicity, based on a distance between the lag corresponding to the peak and the time corresponding to the frequency of the maximum peak in the periodogram.

17. A non-transitory computer-readable recording medium storing therein a program causing a computer to execute processing comprising:
- calculating a periodicity of time series data;
- generating a plurality of subsequences, from the time series data, a length of each subsequence set to the periodicity;
- calculating feature values of the subsequences;
- categorizing the plurality of subsequences, based on the feature values thereof, into one or more groups;
- finding a periodicity of the subsequences belonging in common to one group, based on an occurrence order of the subsequences belonging in common to the one group; and
- performing missing event detection by identifying the subsequence, occurrence of which is expected according to the periodicity of the subsequences belonging in common to the one group, but not found.

18. The non-transitory computer-readable recording medium according to claim 17, wherein the finding a periodicity of the subsequences processing includes:
- creating an incidence matrix, each element thereof defining relation of the subsequence in a row with each group in a column to take a value 1 if the subsequence is categorized in the group, else take value 0; and
- calculating a column-wise periodicity of occurrence of the value 1 in each column of the incidence matrix, and the performing missing event detection processing includes
- identifying a missed event when an element of the incidence matrix that is expected to take a value 1, based on the periodicity in the column that the element belongs, takes a value 0.

19. The non-transitory computer-readable recording medium according to claim 18, wherein the incidence matrix has the number of rows set to the number of the subsequences and the number of columns set to the number of groups into which the subsequences are categorized, wherein an element at i-th row and j-th column of the incidence matrix takes a value 1 if the i-th subsequence is categorized in the j-the group, else takes a value 0, where $1<=i<=$the number of rows and $1<=j<=$the number of columns.

20. The non-transitory computer-readable recording medium according to claim 17, wherein the calculating a periodicity comprises:
- finding a maximum peak in a periodogram of the time series, and
- detecting, in an autocorrelation of the time series, one or more peaks which occur at one or more lags neighboring to a time corresponding to a frequency of the maximum peak in the periodogram to select the lag as the periodicity, based on a distance between the lag corresponding to the peak and the time corresponding to the frequency of the maximum peak in the periodogram.

* * * * *